(12) United States Patent
Paton et al.

(10) Patent No.: US 7,819,439 B2
(45) Date of Patent: Oct. 26, 2010

(54) FISHTAIL BORE SEAL

(75) Inventors: Alan Stewart Paton, Aberdeen (GB); Philip Stanley Roots, Whitwick (GB)

(73) Assignee: Sub-Drill Supply Limited, Aberdeen (GB)

( * ) Notice: Subject to any disclaimer, the term of this patent is extended or adjusted under 35 U.S.C. 154(b) by 896 days.

(21) Appl. No.: 11/485,952

(22) Filed: Jul. 13, 2006

(65) Prior Publication Data
US 2008/0048443 A1 Feb. 28, 2008

(30) Foreign Application Priority Data
Jun. 2, 2006 (GB) ................. 0610786.6

(51) Int. Cl.
F16L 19/06 (2006.01)
(52) U.S. Cl. ..................... 285/341; 285/333; 277/314; 277/614
(58) Field of Classification Search ................ 285/333, 285/334, 334.2, 341; 277/314, 608, 611, 277/614
See application file for complete search history.

(56) References Cited

U.S. PATENT DOCUMENTS

| | | | |
|---|---|---|---|
| 2,376,017 A | 5/1945 | Smallpeice | |
| 3,307,860 A | 3/1967 | Blount et al. | |
| 3,507,506 A | 4/1970 | Tillman | |
| 3,556,568 A | 1/1971 | King | |
| 4,336,958 A | 6/1982 | Goetzinger | |
| 4,470,609 A | 9/1984 | Poe | |
| 4,474,381 A * | 10/1984 | Wilkins et al. | ........... 285/334.2 |
| 4,635,967 A | 1/1987 | Stephenson | |
| 4,984,830 A * | 1/1991 | Saunders | ................ 285/334.2 |
| 5,103,915 A | 4/1992 | Sweeney et al. | |

(Continued)

FOREIGN PATENT DOCUMENTS

GB 2311795 A 10/1997

(Continued)

OTHER PUBLICATIONS

Nicholas, M.G., "Joining Processes" (Introduction to brazing and diffusion bonding), Kluwer Academic Publishers, pp. 16-21; 230-31; 234-41 (1998).

(Continued)

Primary Examiner—David E Bochna
(74) Attorney, Agent, or Firm—Gary L. Bush; Mark D. Shelley, II; Andrew Kurth LLP

(57) ABSTRACT

A bore seal for connecting and sealing oil and gas tubular members is disclosed which has a metal core manufactured from a high yield strength ferrous material and a protective overlay of corrosion and abrasion resistant stainless steel and/or nickel based alloy. The protective overlay is applied to the entire outer surface of the bore seal by a metal thermal spray process, such as plasma thermal spraying. In a preferred embodiment of the invention, the bore seal has a fishtail profile which facilitates the use of resilient seals to provide resistance to external pressures in addition to the traditional metal-to-metal seal between the bore seal and the tubular members. In an alternative embodiment, a pressure relief valve is disposed within the bore seal to verify the integrity of the metal-to-metal seal with respect to internal bore pressure.

19 Claims, 4 Drawing Sheets

U.S. PATENT DOCUMENTS

| | | | |
|---|---|---|---|
| 5,839,765 A * | 11/1998 | Carter et al. ............. | 285/334.2 |
| 6,070,911 A | 6/2000 | Namikawa et al. | |
| 6,322,087 B1 | 11/2001 | Swensen et al. | |
| 6,409,176 B2 | 6/2002 | Allen | |
| 6,450,507 B2 * | 9/2002 | Johnson .................. | 285/334.2 |
| 6,561,521 B2 | 5/2003 | Janoff et al. | |
| 6,722,426 B2 | 4/2004 | Sweeney et al. | |
| 7,025,360 B2 | 4/2006 | Walker et al. | |
| 2003/0155721 A1 | 8/2003 | Zheng | |
| 2004/0056432 A1 | 3/2004 | Walker et al. | |

FOREIGN PATENT DOCUMENTS

| | | | |
|---|---|---|---|
| GB | 2342371 A | | 4/2000 |
| GB | 2377976 A | | 1/2003 |
| GB | 2395530 A | | 5/2004 |
| GB | 2407850 A | | 5/2005 |
| WO | WO 2004/029487 A2 | | 4/2004 |

OTHER PUBLICATIONS

Burakowski, T. and Wierzchon, T., "Surface Engineering of Metals," crc Press, pp. 189-99 (1999).

Heimann, R.B., "Plasma-Spray Coating" VCH, pp. 167-68; 248-49 (1996).

Kazakov, N. F., "Diffusion Bonding of Materials," Mir Publ., Pergamon Press, pp. 10-17 (1985).

Dorfman, M.R. & Novinski, E., "Let's Talk Thermal Spray," Products Finishing, pp. 11; 42-47 (Mar. 1993).

Gordon, England, "Thermal Spray Coatings: Nature of Thermal Spray Coatings" pp. 1-13 (website printed May 2, 2007) at http://www.gordonengland.co.uk/tsc.htm.

Korpiola, K., "High Temperature Oxidation of Metal, Alloy and Cermet Powders in HVOF Spraying Process."(Doctoral Thesis) Helsinki U. of Tech. Publications, TKK-MK-160, Espoo, Finlad (2004) at http://lib.tkk.fi/Diss/2004/isbn9512273284/isbn9512273284.pdf.

Dunkerton, S., "Diffusion Bonding" TWI Knowledge Summary, 2001, pp. 1-4 at http://www.twi.co.uk/j32k/protected/bond_33/kssbd003.html.

UK Intellectual Property Office, Patents Act 1977: Combined Search and Examination Report Under Section 17 & 18(3) for foreign counterpart divisional application GB0723691.2.

UK Intellectual Property Office, Patents Act 1977: Combined Search and Examination Report Under Section 17 and 18(3) for foreign counterpart application GB0610786.6.

* cited by examiner

FISHTAIL BORE SEAL

BACKGROUND OF THE INVENTION

1. Field of the Invention

This invention relates to metal bore seals for sealing connections between oil and gas well tubular members and other equipment in sub-sea drilling and production operations. More specifically, the invention relates to a corrosion-resistant bimetallic compression ring designed for both well pressure containment and deep water pressure resistance.

2. Description of the Prior Art

Many oil and gas fields are situated offshore at various ocean depths. In the oil and gas exploration and production industries, the underwater connection between the wellhead and the rig or platform is achieved by sequentially joining together items of drilling and production equipment, as well as long segments of metal and composite pipes, or riser joints, to form a pressure tight system. Metal bore seals (or gaskets) are commonly used to create and maintain the requisite pressure tight seal at the joints. These bore seals therefore provide metal-to-metal pressure tight seals for up to 15,000 pounds force per square inch ($lbf/in^2$) between the wellhead, connectors, and other equipment used to attach drilling and production equipment to the main well bore, or annulus.

The bore seal in these applications is a compression ring disposed and compressed between the opposing ends of the tubular members to be joined. Prior art bore seal designs conform to several profile types, such as AX, CX, DX, LX, NX, and VX, and generally have an internal diameter matching the bores of tubular members and equipment to be joined and sealed. Typically, the ring is about four inches long (measured in its axial direction) and is machined externally to provide two conical faces tapering towards each end at about a twenty-three degree angle to the axis. The ends of the connecting components are machined to open outwardly in order to provide tapering conical seats for the ring at the same angle but with a slightly smaller diameter. "Energization" or seating of the ring requires bringing the opposing tubular members and the bore seal together with considerable force, and is achieved by one of three methods: (1) hydraulic actuators in one of the opposing components, (2) stud bolts and flanges, or (3) hubs and clamps.

When the necessary force is applied to bring the tubular members and bore seal into assembly, the disparity in diameter between the tubular members and the bore seal produces compressive stress in the seal. "Preloading" is the term for this procedure. The magnitude of the diametral disparity or interference and the yield strength of the seal material govern the contact force between the conical faces. Generally, the preload stress in the bore seal exceeds yield and causes some permanent compressive strain. After the bore seal is properly seated, pressure in the well annulus imparts further energization to the ring thereby adding to that created by the compressive force during preloading.

Bore seals are critical components and their materials need to meet several, sometimes conflicting, requirements. One prior art requirement is that the bore seal should achieve its yield stress during preloading but not have a hardness that causes damage to the seating areas in the connecting tubular members. Thus, a general preference in the manufacture of bore seals is to use low yield strength materials that are no harder than the seat surfaces of the connecting tubular members to minimize the risk of galling during preloading of the connection. These bore seal material requirements are met by specifying Brinell hardness numbers in the range between 110 and 170, which produce yield strengths of 35,000 to 40,000 $lbf/in^2$ in the low carbon steels and series 300 stainless steels employed for bore seal service at bore pressures up to 15,000 $lbf/in^2$ and maximum temperatures of 250° F. The materials described are suitable for sour well service although the low carbon steel is inferior to the stainless steels with regard to overall corrosion resistance. The low carbon steels have limited resistance to extremely corrosive well conditions. Conversely, stainless steels, such as type 316L in particular, have a much wider application.

The design of bore seals has, in the past, been primarily concerned with internal pressure, a mode of operation assisted by bore pressure energization. Bore seals made of low carbon steel or the 300 series stainless steels, being at or close to yield at preload, may suffer an increase of permanent compressive strain during service due to bore diameter changes from rises in temperature and pressure fluctuations. These effects will be greater with the 300 series stainless steels, because their thermal expansion coefficients are about one third greater than those of the low alloy steels used in the manufacture of the tubular members and other equipment. Ideally, the expansion coefficient of the bore seal material should closely match that of the tubular members in between which the bore seal is seated, in order to minimize this effect.

Increases of permanent strain brought about by operating conditions will reduce the contact force created between the seal and seat when the connection was preloaded, although this is unlikely to affect performance if bore pressure and temperature are substantially maintained. However, if the bore pressure and temperature are greatly reduced, the reduction of the diametral interference between seal and seat may result in failure of the connection to retain pressure.

Bore seal materials must be able to resist corrosion by the produced well fluids. In particular, they must resist stress corrosion cracking caused by acid gases, such as $H_2S$ and $CO_2$, dissolved in the liquid phase. This requirement, however, limits the hardness of the bore seal and consequently its material strength. Furthermore, this hardness limitation is in direct conflict with the need for adequate yield strength to resist external pressures, as encountered in deep water operations.

The trend towards deep water exploration at depths exceeding 2,000 feet is the result of oil and gas depletion in shallower offshore waters. Normally, the internal pressure within the well bore or annulus is maintained to equal or exceed the external water pressure. However, as a result of unforeseen behavior in the formation being drilled, a sudden loss of bore pressure to a value below the external pressure can occur.

The low carbon and series 300 stainless steel designs, however, cannot function reliably against external pressure because their low strength levels make them prone to incremental permanent strain due to operational variations of pressure and temperature. The strength of low carbon and series 300 stainless steels is also reduced at elevated temperatures. For the stainless steels often employed in these applications, this reduction in strength can be as much as about 20% at 250° F., which confirms the temperature classification limit previously disclosed.

Notwithstanding cost, bore seal material selection requires the consideration of several factors including material strength, hardness, and corrosion resistance. Several prior art patents have attempted to address this difficulty in bore seal material selection. U.S. Pat. No. 3,507,506 issued to Tillman discloses a sealing ring constructed of a metal, such as steel, and having sealing surfaces with inlays. The sealing ring is coated with different types of plastic flow or elastic material such as Teflon®, Hycar®, rubber, plastic, etc. However, coatings of this type are not durable enough to resist abrasion and corrosion for more than a short period of time. Alternatively, the sealing ring may be coated with silver, lead, zinc, cadmium, copper, etc. to provide a redistributable surface and thereby a tighter joint. However, electroplated metals such as silver, lead, zinc, cadmium or copper can be applied in a thickness range of only 12 to 25 microns and are therefore unable to resist corrosion or abrasion for more than a short period of time.

U.S. Pat. No. 4,635,967 issued to Stephenson discloses a bore seal ring constructed of a corrosion resistant alloy, such as stainless steel. The sealing surfaces of the '967 bore seal ring are preferably protected from corrosion and/or oxidation in the elevated temperature environment by an appropriate plating or coating. Stephenson further discloses that a plating, such as a electrodeposited nickel over hard copper, was successfully used. While electrodeposited nickel can be deposited in thicknesses that will withstand corrosion for extended periods, such material is unsuitable for bore seals because of its extreme hardness and difficulty of machining.

U.S. Pat. No. 6,722,426 issued to Sweeney discloses a composite metal sealing ring constructed of a corrosion resistant alloy, preferably a high strength stainless steel having a yield strength at least from 35,000 to 40,000 lbf/in$^2$. A molybdenum sulfide coating is then applied onto the sealing surfaces to provide lubrication and prevent galling from occurring. While lubricating compounds can be successfully applied, e.g. Teflon® in multiple applications to a thickness of 50 to 60 microns and molybdenum sulfide to 8 to 12 microns, they are also unable to resist abrasion and corrosion for more than a short period of time.

U.S. Pat. No. 7,025,360 and UK Patent Application No. GB2407850A issued to Walker et al. disclose a bimetallic bore seal technology which involves welding a partial stainless steel or corrosion resistant alloy inlay to the first and second outer sealing faces of the bore seal to protect against corrosion at those locations. Due to the partial stainless steel or corrosion resistant inlay, steel with a similar co-efficient of expansion to that of the tubular members can be used to make the remaining bore seal structure. Welding a corrosion resistant inlay onto the bore seal surface solves some of the previously discussed problems; however, it is not an ideal solution. As a partial deposit on the sealing surfaces, the interface between the steel body and welded corrosion resistant alloy inlay may be subject to crevice corrosion. After the corrosion resistant or lubricant coating which is applied over the partially welded gasket has eroded, accelerated corrosion could occur due to bimetallic contact with aqueous electrolyte. Furthermore, in some cases, where the inlay has a high thermal expansion the bore seal may act as a bimetallic strip causing its tips to flex away from the seat areas.

Partial or complete weld coverings have additional potential disadvantages when used to protect and/or strengthen the bore seal core materials. The process of weld deposition generates extreme heat that may affect the mechanical properties of the core bore seal material. The extreme heat may also cause changes to the physical shape of the core bore seal material which can result in post-weld difficulties in machining the bore seal to an accurate shape profile. As previously indicated, crevice corrosion between the weld lines of the bore seal core material and the corrosion resistant inlay may also become apparent over time, especially if there are any imperfections in the welds.

With the current trend towards deep water exploration and drilling, the problem of external pressure comes into greater prominence. Coupled with this, higher temperatures and more aggressive corrosive conditions are encountered as drilled depths increase. All of these factors combine to render obsolete the emphasis on internal pressure containment. The requirement for pressure sealing against deep water external pressures thus imposes two essential features which are lacking in the existing generation of bore seal designs: 1) greater yield strengths which exceed the maximum operating stresses and which enable the seals to work within the elastic limit, and 2) the provision of corrosion resistant alloys suitable for the high-temperature, aggressively-corrosive conditions likely to be experienced in deeper wells, alloys which also facilitate the use of a harder, high-strength, low-alloy steel core.

Greater emphasis on the selection of corrosion resistant materials, such as nickel-based alloys, for bore seal construction, is thus required. Two nickel alloys, alloy 625 and alloy 825 (Inconel®), are specified for use as bore seal materials of construction in severely corrosive conditions with service temperatures up to 400° F. By controlling their heat treatment, these two alloys are used at yield strengths in the range of 40,000 to 70,000 lbf/in$^2$. Moreover, the hardness of each of these alloys is only marginally higher than the hardness of series 300 stainless steels. The nickel alloys 625 and 825 have expansion coefficients which are 10% and 20% higher, respectively, than a low alloy steel. However, a major drawback to the prevalent use of these nickel alloys is their expense. Constructing a metal bore seal completely from a corrosion resistant nickel alloy would solve some of the problems previously discussed, however, such construction would be cost prohibitive in many applications.

The foregoing illustrates a few of the shortcomings of the current sub-sea bore seals in relation to the evolving requirements for deep water drilling and production operations. Thus, a metal bore seal, and method of manufacturing same, which avoids the aforementioned limitations of the prior art, incorporates nickel-based corrosion resistant alloys, and remains cost effective is highly desirable.

3. Identification of Objects of the Invention

A primary object of the invention is to provide a bimetal bore seal, and method of manufacturing same, for sealing connections between oil and gas well tubular members that has the material properties capable of resisting aggressively corrosive conditions and higher temperatures encountered in deeper oil and gas wells, and also resisting external pressure in deep seawater.

Another object is to provide a bimetal bore seal of sufficient yield strength to provide adequate elasticity following a decline from maximum operating conditions to nil bore pressure.

Another object is to provide a bimetal bore seal which has a good strength retention in order to enable the bore seal to operate within its elastic limit and thus maximize its service temperature range.

Another object is to provide a bimetal bore seal with an overall yield strength to withstand external seawater pressure differentials up to 7,500 psi.

Another object is to provide a bimetal bore seal constructed to resist stress corrosion cracking caused by acid gases dissolved in the liquid phase.

Another object is to provide a bimetal bore seal with a metal core constructed from any high strength ferrous material in the range of yield strength up to 180,000 lbf/in$^2$ at room temperature and coated in its entirety with a stainless steel or nickel-based corrosion resistant alloy, which is applied by a thermal spray process.

Another object is to provide a bimetal bore seal with a high strength, high hardness metal core and a corrosion resistant metal coating, which is applied by a thermal spray process to a hardness that is lower than the hardness limit specified by NACE International.

Another object is to provide a bimetal bore seal having commercially available profiles, such as AX, CX, DX, LX, NX, or VX.

Other objects, features, and advantages of the invention will be apparent to one skilled in the art from the following specification and drawings.

SUMMARY OF THE INVENTION

The objects identified above, along with other features and advantages of the invention are incorporated in a bore seal provided for the external and internal sealing of connections between oil and gas well tubular members and other equipment employed in sub-sea drilling and production operations. The bore seal of the invention is a compression ring disposed and compressed between the opposing ends of the tubular members to be joined. The bore seal has an internal diameter matching the bores of tubular members and equipment to be joined and sealed. In a preferred embodiment of the invention, the bore seal is manufactured from high yield strength ferrous material in the range of yield strength up to a maximum of 180,000 lbf/in$^2$ at room temperature and possessing outstanding strength retention at temperatures up to 450° F. The hardness level which accompanies the high strength of the steel precludes its use in direct contact with corrosive well fluids. Therefore, in a preferred embodiment, the bore seal is protected by an overall layer of nickel based corrosion and abrasion resistant alloy. This alloy coating is preferably applied to the outer surface of the bore seal by a metal thermal spray process to a thickness between 0.01 and 0.1 inches, more preferably between 0.02 and 0.08 inches, most preferably between 0.03 and 0.06 inches. The alloy coating further provides a hardness within the limit specified by NACE International for sour well service.

In a preferred embodiment of the invention, the bore seal resists external pressure due to the contact force between the seal and the seat areas. The nominal interference between the seal and the seat areas is set so that the seal's preload stress at minimum interference produces the desired external pressure resistance consistent with a stress at maximum interference, which remains below the material's yield stress. Consideration is also provided for any reduction in yield and Young's modulus at the maximum design temperature. In another preferred embodiment of the invention, the bore seal central rib has a fish-tail profile with a resilient seal or seals in each of its upper and lower surfaces. Resistance to external pressure is provided independently of the contact force at the metal-to-metal contact between the interior portion of the bore seal and its seating areas. The rib seals seal against both internal and external pressure, and further provide the bore seal with an enhanced sealing mechanism consisting of two separate sealing areas.

BRIEF DESCRIPTION OF THE DRAWINGS

By way of illustration and not limitation, the invention is described in detail hereinafter on the basis of the embodiments represented in the accompanying figures, in which.

DESCRIPTION OF THE PREFERRED EMBODIMENTS OF THE INVENTION

Figure 1:
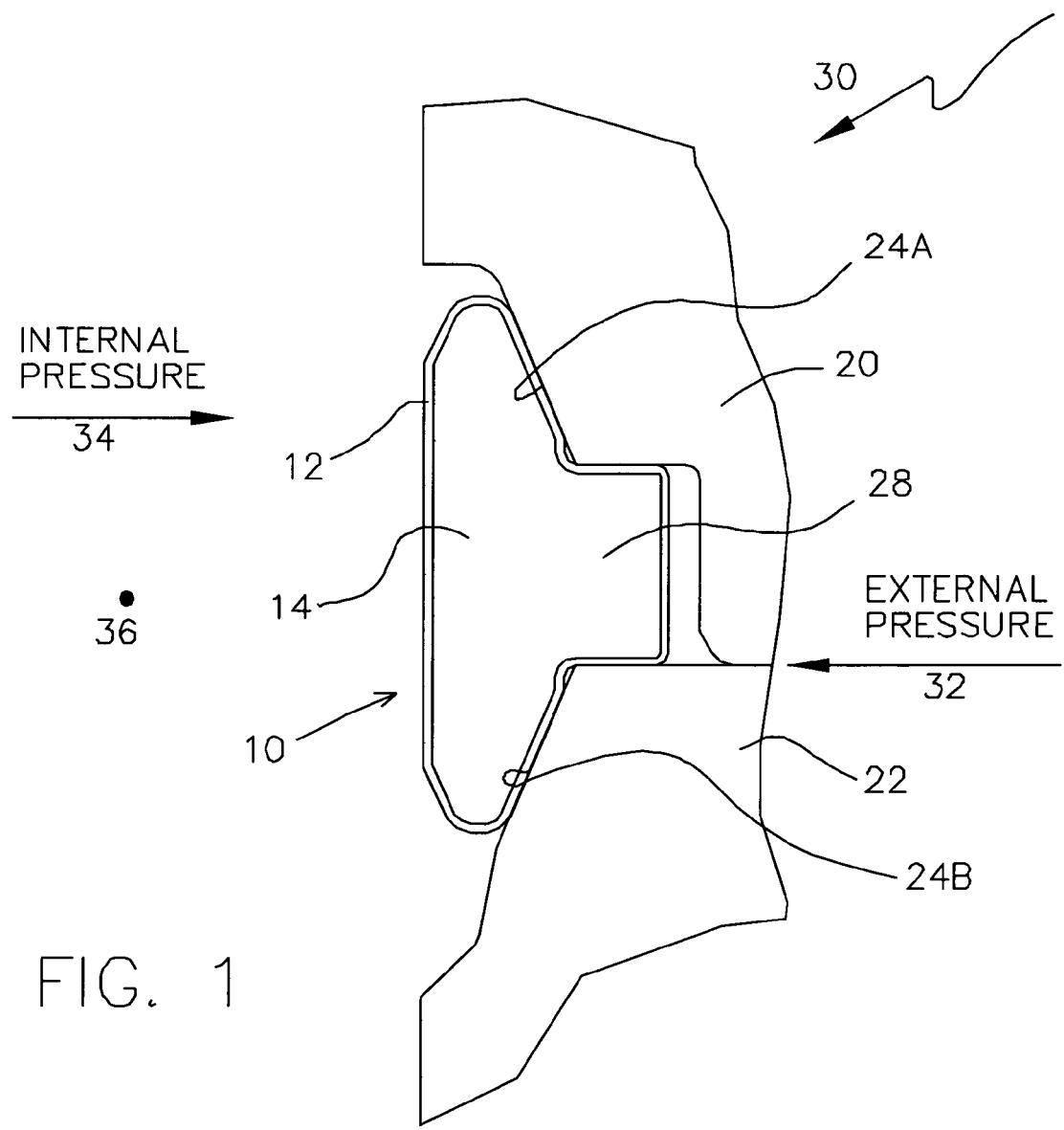
FIG. 1 illustrates a one-sided, cross-sectional view of upper and lower tubular members connected using a preferred embodiment of a bore seal disposed therebetween.

The preferred embodiment of the invention is a bore seal which alleviates one or more of the deficiencies described in the prior art and incorporates one or more of the objects previously identified. The bore seal of the present invention is a compression ring disposed and compressed between the opposing ends of the oil and gas well tubular members to be joined. The bore seal of the preferred embodiment has an internal diameter/shape arranged and designed to match the bores of tubular members and equipment to be joined and sealed, including commercially available profiles, such as AX, CX, DX, LX, NX, VX, etc. The ring is about four inches long (measured in its axial direction) and is machined externally to provide two conical faces tapering towards each end at about a twenty-three degree angle to the axis. The ends of the connecting components are machined to open outwardly in order to provide tapering conical seats for the ring at the same angle but with a slightly smaller diameter. Seating of the ring requires bringing the opposing tubular members and the bore seal together with considerable force. This is achieved using one of three methods: (1) hydraulic actuators in one of the opposing components, (2) stud bolts and flanges, or (3) hubs and clamps.

In a preferred embodiment, the bore seal has a metal core constructed from a high yield strength ferrous material including, but not limited to, low alloy steels and martensitic stainless steel. These materials are in the range of yield strength up to a maximum of 180,000 lbf/in$^2$ at room temperature and have outstanding strength retention at temperatures up to 450° F. However, the hardness level of the metal core which accompanies the high strength of the steel precludes its use in direct contact with corrosive well fluids. The bore seal metal core is therefore protected by a layer of stainless steel or nickel-based corrosion resistant alloy which provides a hardness limit specified by NACE International for sour well service. The stainless steel or nickel-based corrosion resistant alloy is applied to the outer surface of the bore seal metal core using a metal thermal spraying process.

The metal thermal spraying process generally uses a thermal spraying device, or gun, to heat the coating metal into a molten or semi-molten state. Compressed gas then atomizes and deposits the molten, atomized metal onto the surface to be coated at a high velocity to form a dense adherent coating of any desired thickness. The molten, atomized metal is uniformly deposited as rapidly quenched splats, which are single sprayed particles that, under magnification, resemble thin, flattened drops of liquid. The coating is formed on the sprayed surface through the aggregation of these splats. Thus, the microstructure of a thermal spray coating differs from the microstructure of coatings produced by other methods, such as dipping/immersion, brush painting, etc.

Three different types of thermal spraying devices—plasma, combustion-flame, and two-wire electric arc—are employed for melting and depositing the molten, atomized metal coating onto the surface to be coated. The plasma thermal spraying gun uses a plasma flame, wherein the plasma gas (generally, argon or other inert gas) is elevated to temperatures well above its ordinary gaseous state by an electric arc or other heat source. Typically, the coating metal is fed through the plasma gun as a powder, melted by the plasma flame, and blown onto the surface to be coated at a high velocity (usually greater than 200 meters/second) to form a highly dense adherent coating. The plasma thermal spraying gun is the most versatile thermal spraying device because virtually any metal or metal alloy can be melted and applied to a surface to be coated.

The combustion-flame thermal spraying gun, which uses an oxyacetylene-generated flame to melt a metal powder or wire, is easier to operate than the plasma thermal spraying gun. Unlike the plasma flame, however, the oxyacetylene flame has a much lower temperature which causes the molten metal powder or wire to be deposited onto the surface to be coated at a lower velocity and with lower density. But, the recent development and use of a high velocity oxygen fuel (HVOF) gun makes the combustion-flame thermal spraying techniques equal to or better than the plasma thermal spraying technique with respect to the final coating properties. Like the plasma thermal spraying gun, the HVOF gun causes the molten coating metal to be deposited onto the surface to be coated at high velocity to form a highly dense and adherent coating. This is achieved using specially-sized metal powder particles and a specially-designed gun nozzle which creates hypersonic flame gas velocities.

The two-wire electric arc technique is the least expensive metal thermal spraying process. In this technique, an electric current is passed through two metal wires to generate an electric arc at the point where the two wires intersect. The electric arc melts the ends of the metal wire and compressed air then blows the atomized metal through the nozzle of the spray gun onto the surface to be coated.

In the metal thermal spray process, the molten metal solidifies quickly on the applied surface by dissipating heat via conduction through the underlying surface. An advantage of the metal thermal spray process over traditional welding techniques is that the temperature of the bore seal core metal does not generally exceed 200° F. when the overlay coating material is applied to the core metal surface. Thus, the metal thermal spray process mitigates thermal degradation and/or thermal stress of the underlying bore seal metal core.

The metal thermal spray process, as briefly disclosed above, is well known in the art and therefore will not be further discussed herein.

A preferred embodiment of the invention is shown in FIG. 1 in which the bore seal 10 has a coating 12 of stainless steel or nickel-based alloy applied by a metal thermal spraying process and overlaying a metal core 14 having the physical properties previously disclosed. The bore seal 10 achieves resistance to external pressure 32 (i.e. seawater pressure) solely by the contact force between the bore seal 10 and seating areas 24A, 24B. As shown in FIG. 1, the bore seal seating areas are the frustoconical surfaces 24A, 24B of the upper 20 and lower 22 connecting tubular components. The contact force between the bore seal 10 and the seating areas 24A, 24B arises from the seat/seal interference and provides the required resistance to external pressure 32.

The basis for the bore seal's 10 external pressure rating is the minimum value of its resistance when unaided by internal pressure 34 within the connection 30 (i.e. the resistance provided solely by the seat/seal interference). The resistance to external pressure 32 is related to the compressive hoop stress developed in the seal 10 by the seat/seal interference. To ensure reliability of its rated resistance, the seal 10 is designed such that the minimum seat/seal interference does not deteriorate due to variations in the bore diameter from operational fluctuations of temperature and pressure. The nominal seat/seal interference is set so that the seal's 10 preload stress at minimum seat/seal interference produces the desired external pressure resistance consistent with a stress at maximum seat/seal interference that is below the material's yield stress at the maximum design temperature. The arrangement of interferences and stresses thus developed avoids permanent strain in the seal 10 which would reduce the minimum interference, and as a consequence, its external pressure rating.

The service limits for the embodiment shown in FIG. 1 are conditioned by the dimensional interaction between the bore seal 10 and the frustoconical seating areas 24A, 24B at elevated temperatures. For bore temperatures up to 300° F., the external pressure 32 at sea depths of approximately 5,000 feet would be resisted by the seat/seal interferences in the event of total collapse of internal pressure 34 within the bore 36. Taken together, these statistics approximate the best possible resistance at moderate operational temperatures, because resistance to external pressure 32 declines with increasing temperature within the bore 36.

Figure 2:
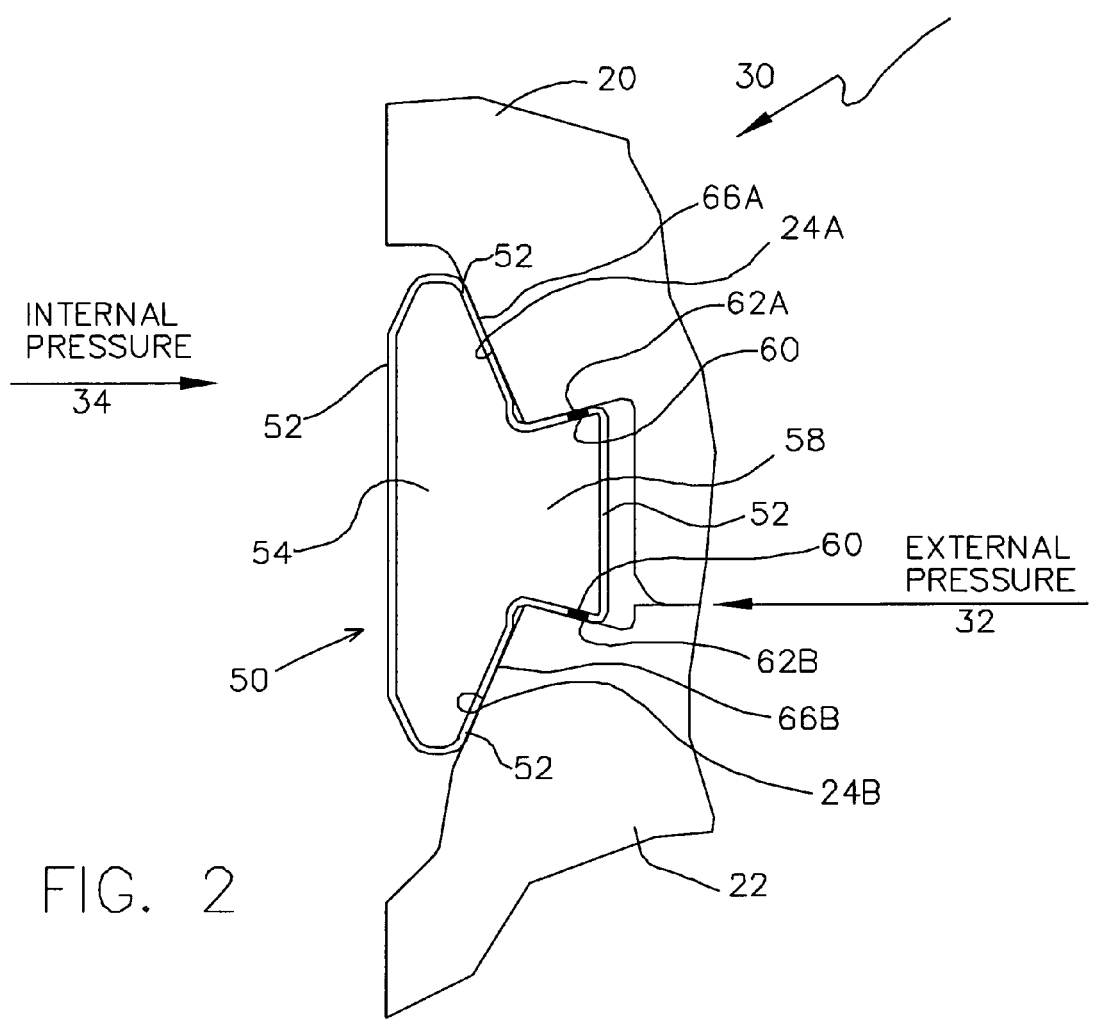
FIG. 2 illustrates a one-sided, cross-sectional view of upper and lower tubular members connected using a preferred alternative embodiment of a bore seal having a "fish-tail" profile and resilient seals for providing resistance to external pressures in addition to the metal-to-metal seal between the bore seal and the upper and lower tubular members.
Figure 3:
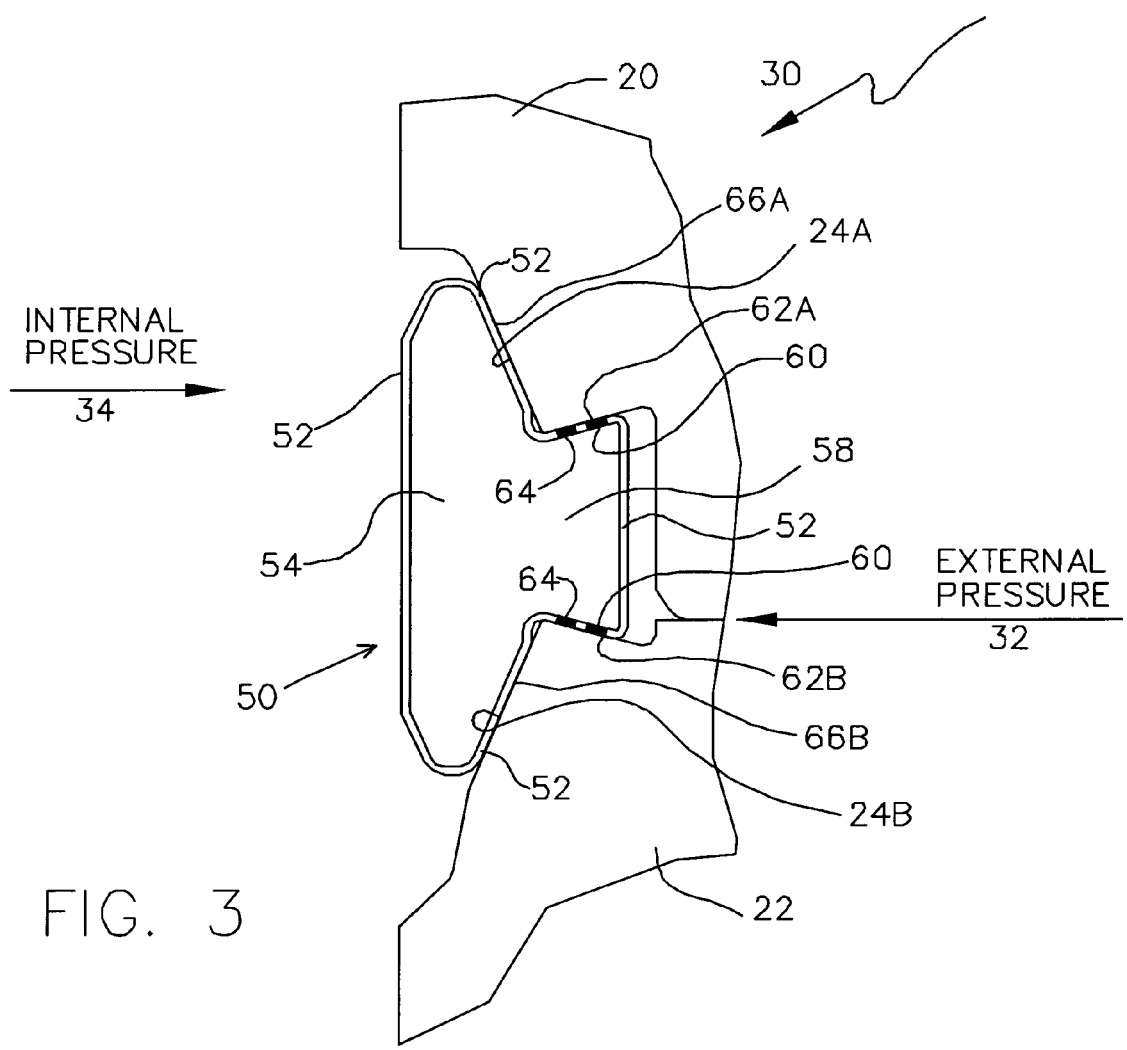
FIG. 3 illustrates an alternative embodiment of the bore seal of FIG. 2 having an additional set of resilient seals for providing additional resistance to external pressures.

In a preferred alternative embodiment of the invention, as shown in FIG. 2, the bore seal 50 has a coating 52 of stainless steel or nickel-based alloy applied by a metal thermal spraying process and overlaying a metal core 54 having the physical properties previously disclosed. The central rib 58 of the bore seal 50 has a "fish-tail" profile, designated SDX, with a resilient rubber seal 60 in each of its upper 62A and lower 62B surfaces. Resistance to external pressure 32 is thus provided independently of the contact force at the metal-to-metal contact between the surfaces 66A, 66B of the bore seal 50 and its seating areas 24A, 24B. The rib seals 60 seal against internal pressure 34 and external pressure 32, as the case may be, and provide a bore seal 50 with an enhanced sealing mechanism consisting of two separate sealing areas 24A, 24B, 62A, 62B. The resilient rubber seals 60 are preferably constructed from nitrile rubber; however, the seals 60 may also be constructed from other specialized rubber compounds, such as Viton®, etc. Alternatively, as shown in FIG. 3, additional resilient seals 64 are disposed next to the existing resilient seals 60. The additional resilient seals 64 provide additional resistance to external pressure if the existing resilient seals 60 are compromised or do not seat properly between upper 20 and/or lower 22 tubular components.

The alternative embodiments of the invention, illustrated in FIGS. 2 and 3, have the advantage of isolating the seal pressure to a small portion of the bore seal's 50 outer surface 62A, 62B thereby greatly increasing the external pressure 32 which the bore seal 50 as a whole can resist. The pressure seal established by the fish-tail profile is also further energized when affected by external pressure 32. The bore seal 50 may also be subjected to higher temperatures provided that any permanent strain resulting from the dimensional changes caused by the higher temperatures does not reduce the preload interference to the point where the metal-to-metal areas 24A, 24B, 66A, 66B between the bore seal 50 and the upper 20 and lower 22 tubular components fail to properly seal. This stipulation thus provides the basis for the upper temperature limit of the bore seal 50.

Figure 4:
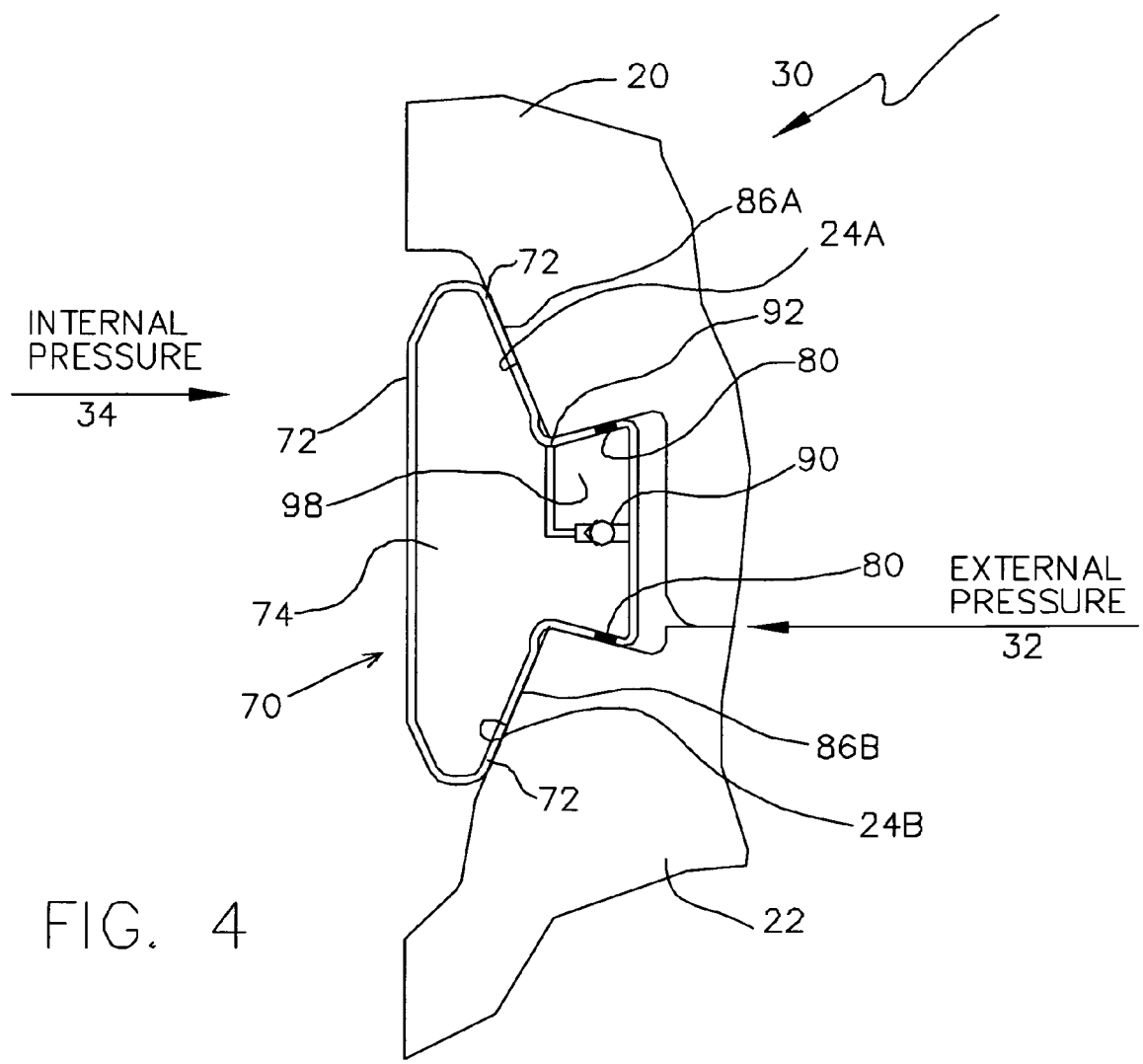
FIG. 4 illustrates an alternative embodiment of the bore seal of FIG. 2 having a pressure relief valve disposed therein for proving the integrity of the metal-to-metal seal between the bore seal and the upper and lower tubular members.

FIG. 4 illustrates a preferred alternative embodiment of a bore seal 70, as first disclosed in FIG. 2, which additionally provides proof of the integrity of the metal-to-metal seal between the bore seal 70 and the upper 20 and lower 22 tubular members. As shown in FIG. 4, the bore seal 70 has a coating 72 of stainless steel or nickel-based alloy applied by a metal thermal spraying process and overlaying a metal core 74 having the physical properties previously disclosed. A pressure set relief valve 90, which checks the reverse external pressure, is installed in the bore seal 70 and connected to a port 92 at the interface between the metal-to-metal face 24A, 24B, 86A, 86B and the fish-tail resilient seal 80. If the metal-to-metal seal fails, then the internal pressure 34 will bypass the fish-tail resilient seal 80 thus revealing the failure to the operator. In this embodiment, therefore, the fish-tail resilient seals 80 will not enhance the internal sealing capability of the bore seal 70 against the forces of internal pressure 34.

The abstract of the disclosure is written solely for providing the United States Patent and Trademark Office and the public at large with a description to determine quickly from a cursory inspection the nature and gist of the technical disclosure, and it represents solely a preferred embodiment and is not indicative of the nature of the invention as a whole.

While the preferred embodiment of the invention has been illustrated in detail, it is apparent that modifications and adaptations of the preferred embodiment will occur to those skilled in the art. Such modifications and adaptations are in the spirit and scope of the invention as set forth in the following claims:

What is claimed is:

1. An apparatus for sealing a connection (30) between oil and gas well tubular members (20, 22) comprising,
   a compression ring (10, 50, 70) defining an axial bore therethrough with an internal diameter adapted to align with bores of an upper tubular member (20) and a lower tubular member (22), said compression ring having an upper compression ring surface (66A, 86A) arranged and designed to sealingly engage an upper tubular member frustoconical seating area (24A), a lower compression ring surface (66B, 86B) arranged and designed to sealingly engage a lower tubular member frustoconical seating area (24B), and a central rib (28, 58, 98) extending outwardly from said axial bore beyond said upper and lower compression ring surfaces, said central rib having an upper surface (62A) arranged and designed to seat with said upper tubular member and a lower surface (62B) arranged and designed to seat with said lower tubular member, wherein in a cross section of said compression ring along said axial bore, said central rib has a shape profile of a fishtail such that axial distance between said upper surface and said lower surface increases as said central rib extends outwardly from said axial bore, and
   a resilient rubber seal (60, 64, 80) coupled to at least one of said upper surface and said lower surface for providing additional sealing resistance to external pressure (32).

2. The apparatus of claim 1 wherein,
   said compression ring has a metal core (14, 54, 74) constructed from a first metal, said metal core underlying a protective layer coating (12, 52, 72) constructed from a second metal.

3. The apparatus of claim 2 wherein,
   said first metal is a high yield strength steel having a yield strength between 70,000 to 180,000 lbf/in$^2$.

4. The apparatus of claim 2 wherein,
   said second metal is a stainless steel.

5. The apparatus of claim 2 wherein,
   said second metal is a nickel alloy.

6. The apparatus of claim 1 further comprising,
   a pressure relief valve (90) disposed within said central rib of said compression ring and in fluid communication with a port opening (92) in said compression ring positioned between one of said upper and lower compression ring surfaces and said resilient seal (80).

7. The apparatus of claim 2 wherein,
   said protective layer coating has a microstructure of aggregated splats characteristic of a coating applied by a metal thermal spraying process.

8. A bore seal (10, 50, 70) for sealing a connection (30) between upper and lower oil and gas well tubular members (20, 22) comprising:
   a ring-shaped core (14, 54, 74) having a bore therethrough defining a longitudinal axis through its center, said ring-shaped core characterized by upper and lower bore seal halves that are symmetric about a geometric plane perpendicular to said longitudinal axis,
   said ring-shaped core defining an upper ring surface (66A, 86B) symmetric about said longitudinal axis and arranged and designed to sealingly engage an upper tubular member surface (24A), a lower ring surface (66B, 86B) symmetric about said longitudinal axis and arranged and designed to sealing engage a lower tubular member surface (24B), and a central rib (28, 58, 98) bisected by said geometric plane, integral with said ring-shaped core, and extending outwardly away from said longitudinal axis beyond said upper and lower ring surfaces, said central rib having an upper surface (62A) arranged and designed to seat with said upper tubular member and a lower surface (62B) arranged and designed to seat with said lower tubular member, said upper surface and said lower surface each extending outwardly at an acute angle relative to any perpendicular axis to said longitudinal axis within said geometric plane, and
   a resilient rubber seal (60, 64, 80) coupled to at least one of said upper surface and said lower surface for providing additional sealing resistance to external pressure (32).

9. The bore seal of claim 8 wherein,
   said core (14, 54, 74) is composed of a high yield strength steel.

10. The bore seal of claim 9 further comprising,
    a protective layer (12, 52, 72) overlaying said core (14, 54, 74), wherein said protective layer has a microstructure of aggregated splats characteristic of a coating applied by a metal thermal spraying process.

11. The bore seal of claim 10 wherein,
    said protective layer (12, 52, 72) is composed of a stainless steel.

12. The bore seal of claim 10 wherein,
    said protective layer (12, 52, 72) is composed of a nickel alloy.

13. The bore seal of claim 8 further comprising:
    a pressure relief valve (90) disposed within said central rib of said bore seal (70) and in fluid communication with a port opening (92) in said bore seal positioned between one of said upper and lower ring surfaces and said resilient seal (80).

14. A process for manufacturing a bore seal (10, 50, 70) for sealing a connection (30) between upper and lower oil and gas well tubular members (20, 22), said process comprising the steps of:
    fabricating a ring-shaped metal core (14, 54, 74), said ring-shaped metal core fabricated with a bore therethrough defining a longitudinal axis through its center, said ring-shaped metal core characterized by upper and lower bore seal halves that are symmetric about a geometric plane perpendicular to said longitudinal axis, said ring-shaped metal core also fabricated to have an upper ring surface (66A, 86A) symmetric about said longitudinal axis and arranged and designed to sealingly engage an upper tubular member surface (24A), a lower ring surface (66B, 86B) symmetric about said longitudinal axis and arranged and designed to sealing engage a lower tubular member surface (24B), and a central rib (28, 58, 98) bisected by said geometric plane, integral with said ring-shaped metal core, and extending outwardly away from said longitudinal axis beyond said upper and lower ring surfaces, said central rib having an upper surface (62A) arranged and designed to seat with said upper tubular member and a lower surface (62B) arranged and designed to seat with said lower tubular member, said upper surface and said lower surface each extending outwardly at an acute angle relative to any perpendicular axis to said longitudinal axis within said geometric plane, and coupling a resilient rubber seal (60, 64, 80) to at least one of said upper surface and said lower surface to provide additional sealing resistance to external pressure (32).

15. The process of claim 14 wherein,
said metal core is formed of a high yield strength steel.

16. A bore seal manufactured by the process of claim 14.

17. The process of claim 14 further comprising the step of applying a protective layer (12, 52, 72) onto said ring-shaped metal core (14, 54, 74) using a metal thermal spraying process.

18. The process of claim 17 wherein,
said protective layer is formed of a stainless steel.

19. The process of claim 17 wherein,
said protective layer is formed of a nickel alloy.

* * * * *